United States Patent [19]
Matsumoto et al.

[11] Patent Number: 5,429,008
[45] Date of Patent: Jul. 4, 1995

[54] METHOD AND APPARATUS FOR MEASURING FIGURE OF DEFLECTION OF GOLF CLUB SHAFT

[75] Inventors: Norio Matsumoto, Saitama; Koichi Kameoka, Hyogo, both of Japan

[73] Assignee: Fujikura Rubber Ltd., Tokyo, Japan

[21] Appl. No.: 23,368

[22] Filed: Feb. 25, 1993

[30] Foreign Application Priority Data

Feb. 28, 1992 [JP] Japan .................. 4-042905
Sep. 28, 1992 [JP] Japan .................. 4-257982

[51] Int. Cl.$^6$ ........................... G01L 1/04
[52] U.S. Cl. ................ 73/862.639; 273/80 B
[58] Field of Search ........ 273/80 B; 73/862.621, 73/862.637, 862.639

[56] References Cited

U.S. PATENT DOCUMENTS

| | | | |
|---|---|---|---|
| 3,992,933 | 11/1976 | Randolph, Jr. | 73/862.639 |
| 4,455,022 | 6/1984 | Wright | 273/80 B |
| 4,558,863 | 12/1985 | Haas et al. | 273/80 B |
| 5,018,735 | 5/1991 | Meredith et al. | 273/80 B |
| 5,192,073 | 3/1993 | Iwanaga et al. | 273/80 B X |

FOREIGN PATENT DOCUMENTS

2090536  7/1982  United Kingdom ............ 273/80 B

*Primary Examiner*—Richard E. Chilcot, Jr.
*Assistant Examiner*—Elizabeth L. Dougherty

[57] ABSTRACT

A method for measuring figure of deflection of a golf club shaft, including the steps of horizontally orienting the golf club shaft along an x-axis and fixing a grip end of the golf club shaft to form a cantilever, deflecting the golf club by applying a predetermined load at points on the golf club shaft located on the side of the shaft near the free end thereof to form a deflection curve of the golf club shaft, and obtaining the location of an intersection point of a tangent of the deflection curve and the x axis. The tangent is obtained at the load applying point or in the vicinity of the load applying point on the free end side of the golf club shaft. The method further includes the step of determining a distance between the intersection point and a specific point on the golf club shaft to obtain a parameter which represents the figure of deflection of the golf club shaft.

19 Claims, 12 Drawing Sheets

_Fig_ - 1

_Fig_ - 2

Fig-3

_Fig - 4_

_Fig - 5_

METHOD AND APPARATUS FOR MEASURING FIGURE OF DEFLECTION OF GOLF CLUB SHAFT

BACKGROUND OF THE INVENTION

1. Field of the Invention

The present invention relates to a method and apparatus for measuring figure of deflection (i.e., deflection characteristics) of a golf club shaft.

2. Description of Related Art

Deflection of a golf club shaft is represented by a bend value which is in turn represented by a maximum displacement (i.e., deflection or elastic deformation) of a tip end (i.e., head end) of a golf club that is measured when a predetermined weight is suspended from the tip of the golf club whose butt end (i.e., grip end) is fixed. Note that, in a tapered rod like a golf club shaft, the larger diameter end is called the butt end and the smaller diameter end the tip end. The deflection decreases as the stiffness of the club shaft increases. Accordingly, the stiffness of the club shaft can be represented by the bend value. The whole figure of deflection of the club shaft cannot, however, be identified by the bend value.

Another parameter of figure of deflection of a golf club is known as a "kick point". This concept has been developed to detect the portion of the club which can be most easily deformed. The kick point is represented, for example, by a ratio of the butt bend value, measured when a weight is suspended from the butt end of the club shaft, to the tip bend value, measured when the weight is suspended from the tip end of the club shaft. A ratio of around 2.3 corresponds to an intermediate kick point. A ratio larger than 2.3 (e.g., around 3.0) corresponds to a tip kick point, and a ratio smaller than 2.3 (e.g., 1.8) corresponds to a butt kick point. However, it is very difficult to intuitively grasp or recognize the numerical values of the various kick points since the kick point values have no dimension, Namely, the kick points values do not represent any length.

SUMMARY OF THE INVENTION

The primary object of the present invention is to provide a method and apparatus for measuring the figure of deflections of golf club shafts by a parameter, other than the conventional bend value or kick point value, which can be easily and intuitively recognized.

The basic concept of the present invention resides in measuring figure of deflection of golf club shaft using a specific parameter. The parameter of the present invention is represented by a deflection angle at a point of the club shaft at which a load (i.e., weight) is applied. The parameter of the present invention, which represents the figure of deflection of the golf club shaft can be intuitively grasped.

According to the present invention, the golf club shaft is oriented horizontally along an x-axis and fixed at the butt end thereof to form a cantilever. The x-axis is defined by a center axis of the golf club shaft when no load is applied thereto. A predetermined load is applied at a point of the golf club shaft on the free end side thereof to deflect the golf club shaft. Thereafter, an intersection point of the x-axis and a tangent of a deflection curve of the golf club shaft at the load applying point is obtained. the tangent is obtained at the load applying point or in the vicinity of the load applying point of the golf club shaft. Thereafter, a distance λ of the intersection point from a specific point on the fixed end side or the free end side of the golf club shaft is obtained. The distance λ thus obtained is used as a parameter in representing the figure of deflection of the golf club shaft.

Since the parameter λ has a dimension of length, the figure of deflection of the golf club shaft can be easily and intuitively determined.

The present invention is also addressed to an apparatus for measuring a figure of deflection of a golf club shaft, comprising a means for horizontally orienting the golf club shaft along an x-axis and fixing a grip end of the golf club shaft to form a cantilever, wherein the x-axis is defined by a center axis of the golf club shaft when no load is applied thereto. The apparatus further comprises a means for applying a predetermined load at a point of the golf club shaft whose butt end is fixed, thereby forming a cantilever which defines a deflection curve thereof, a means for detecting an intersection point of a tangent of the deflection curve, obtained at the point at which a load is applied or in the vicinity of the load applying point of the golf club shaft, and the x-axis, and a means for detecting a distance of the intersection point from a specific point on the golf club shaft to determine a parameter which represents the figure of deflection of the golf club shaft.

According to another aspect of the present invention, there is provided an apparatus for measuring figure of deflection of a golf club shaft, comprising a means for horizontally orienting the golf club shaft along an x-axis and fixing a grip end of the golf club shaft to form a cantilever, wherein the x-axis is defined by a center axis of the golf club shaft when no load is applied thereto, a means for applying a predetermined load at a point of the golf club shaft whose butt end is fixed so as to form a cantilever, so as to define a deflection curve thereof, a means for detecting displacement of the golf club shaft at the load applying point, and at the free end of the golf club shaft, from the x axis, and a means for calculating a λ and/or a ratio $\lambda/(S_o - Z)$, in accordance with the displacements, wherein λ designates the distance between the fixed end of the golf club shaft and an intersection point of the x-axis and a tangent of a deflection curve of the golf club shaft, Z the distance between the load applying point and the free end of the golf club shaft, and $S_o$ the length of the golf club shaft.

With this structure, distance λ and/or the ratio of $\lambda/(S_o - Z)$ can be easily obtained.

According to still another aspect of the present invention, the figure of deflection of the club shaft is measured by detecting the curvature distribution of the golf club shaft in the longitudinal axis direction thereof. Namely, a measuring method of the invention comprises steps of applying a predetermined load at various points of the golf club shaft whose butt end is fixed, thereby deflecting the golf club shaft, measuring the displacements of the golf club shaft from the x axis thereof at each load applying point in the longitudinal direction of the golf club shaft, obtaining an approximate deflection curve of the golf club shaft in accordance with the measurements of the displacements, and obtaining a curvature curve (i.e., curvature distribution curve) which represents a curvature distribution of the golf club shaft in the longitudinal axis direction, based on the approximate deflection curve.

In this measuring method, the curvature curve of the golf club shaft in the longitudinal axis direction thereof can be easily obtained, so that the figure of deflection of the golf club shaft in the longitudinal axis direction at each sampling point can be intuitively learned.

Furthermore, the inventors of the present invention have found that the center of figure of the deflection curve (i.e., centroid of the area under the deflection curve) is identical to the above-mentioned distance λ. More specifically, the inventors found that one of the parameter λ which represent the figure of deflection of the golf club is geometrically related to the curvature of the golf shaft. This means that the λ can be determined by the curvature curve. Therefore, an additional step is performed to obtain the center of figure of the curvature curve. Consequently, the distance between the intersection point of the x-axis and the tangent of the deflection curve at the load applying point of the golf club shaft, and the specific point on the fixed end side of the golf club shaft can be substantially determined from the curvature curve.

The displacements of the club shaft from the x-axis are measured at a plurality of sampling points on the club shaft which are spaced at a predetermined distance in the longitudinal axis direction thereof. The approximate deflection curve can be obtained, for example, by a least square method.

The present disclosure relates to subject matter contained in Japanese patent application Nos. 04-42905 (filed on Feb. 28, 1992) and 04-257982 (filed on Sep. 28, 1992), which are expressly incorporated herein by reference in their entirety.

BRIEF DESCRIPTION OF THE DRAWINGS

The invention will be described below in detail with reference to the accompanying drawings, in which;

FIG. 9 is a diagram showing examples of approximate deflection curves of three golf club shafts whose hardnesses are all S;

DESCRIPTION OF THE PREFERRED EMBODIMENT

The following discussion will be directed to a method and apparatus for determining figure of deflection of a golf club shaft, in which a specific parameter λ is used.

Figure 1:
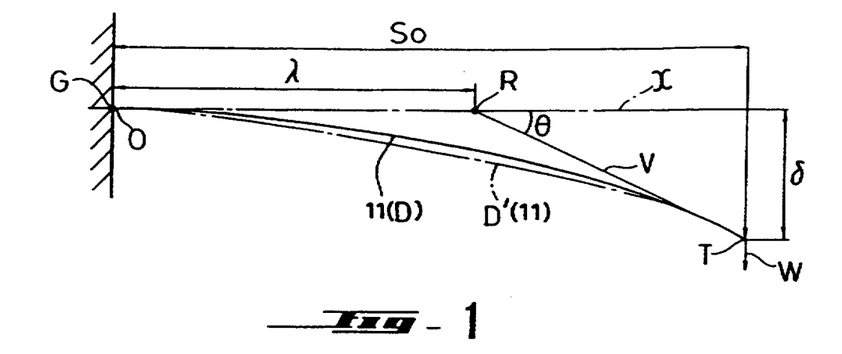
FIG. 1 is an explanatory skeleton view showing the principle of measurement of a figure of deflection of a golf club shaft according to the present invention.

FIG. 1 is a conceptual view of the principle of the measurement of the present invention.

A shaft 11 of a golf club is horizontally oriented along an x-axis of a Cartesian coordinate system, and fixed at a butt end (i.e., grip end) G thereof to form a cantilever. The grip end G of the cantilever (i.e., club shaft 11), is fixed at the origin O of the coordinate system. The club shaft 11 has a length $S_o$.

If a predetermined load W acts on the free end (tip end) T of the club shaft 11, the club shaft 11 will be deflected or elastically deformed. Thereafter, an intersection R of the x-axis and a tangent V of the deflection curve D (i.e., club shaft 11) at the load applying point W thereof, is obtained. Consequently, the figure of deflection of the club shaft 11 is represented by a value (i.e., parameter) of distance λ of the intersection R from the fixed point O. Alternatively, the figure can be represented by a ratio $\lambda/S_o$ of the length $S_o$ of the club shaft 11 (measured from the fixed point O to the free end T) and the distance λ. Consequently, the portion of the golf club shaft 11 at which the golf club shaft 11 is most easily bent comes closer to the free end T of the shaft 11 as the value of λ (or ratio $\lambda/S_o$) increases. Thus, the figure of deflection of the club shaft can be intuitively learned in accordance with the value of λ (or ratio $\lambda/S_o$).

Note that even if a deflection curves D′ (designated at a dashed-dotted line in FIG. 1, different from the deflection curve D) is obtained on the portion closer to the grip end G than the free end T due to a difference in flexural rigidity distribution of the golf club shaft 11, as shown in FIG. 1, the evaluation shows no difference in expression of the deflection as long as there is no difference in the deflection angle $\theta$ and the displacement (deformation) $\delta$ between the deflection curves R and R′, as can be seen in FIG. 1.

The value λ can also be obtained by the calculation using the displacement $\delta$, the deflection angle $\theta$, and the length $S_o$, if the value of $\theta$ (radian) is very small (i.e., $\theta \approx \tan \theta$), as follows.

$$\tan \theta = \delta/(S_o - \lambda) \approx \theta$$

$$S_o - \lambda = \delta/\theta$$

$$\lambda = S_o - \delta/\theta$$

$$\lambda/S_o = 1 - \delta/S_o \theta$$

Note that the length $S_o$ is the length from the free end T to the fixed point G, but the value $S_o$ in the ratio $\lambda/S_o$ can be replaced with the entire length of the golf club shaft 11 or an approximate value thereof.

In the above description, only the tangent of the deflection curve at the free end T is defined to obtain the figure of deflection. However, provided a load W (displacement $\delta$) is small, such that the shaft is not significantly deflected, points along the golf club shaft in the vicinity of the load applying point can be considered as substantially straight. Therefore, the same intersection point of the tangent and the x-axis (distance $\lambda$) can be obtained by defining a tangent of the deflection curve at a specific point in the vicinity of the load applying point of the golf club shaft.

In the illustrated embodiment, although the fixed end G defines the specific point at which the parameter represented by the value of $\lambda$ is measured, the free end T of the shaft 11 can be used as the specific point, wherein the parameter which expresses the figure of deflection is represented by the length of the intersection R from the free end T (i.e., specific point).

Figure 2:
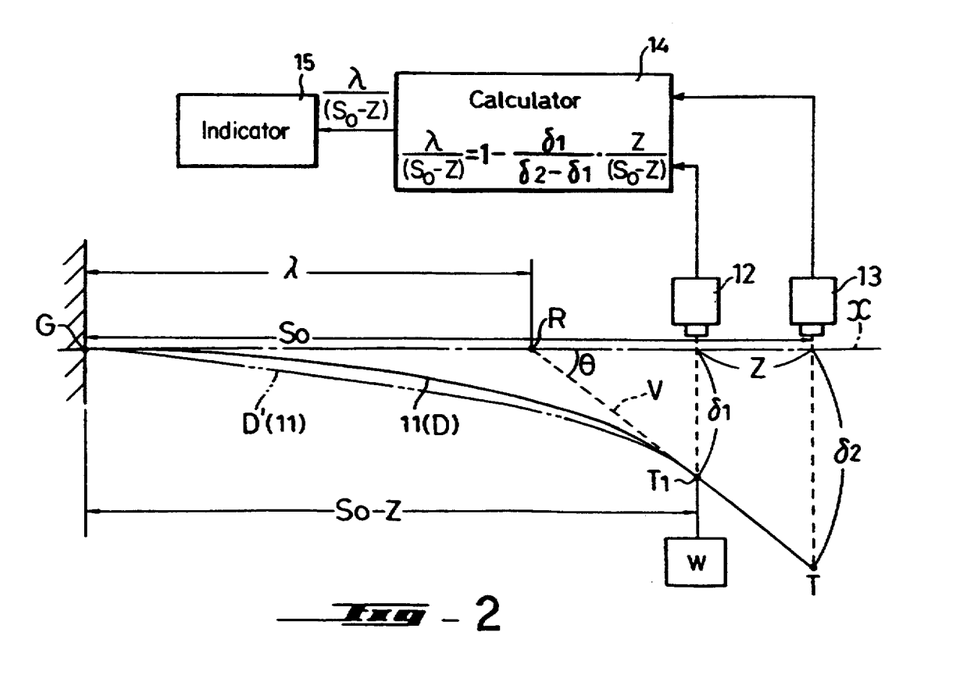
FIG. 2 is an explanatory skeleton view of an embodiment of a measuring method of a figure of deflection of a golf club shaft according to the present invention.

FIG. 2 shows a simple measuring apparatus for obtaining the ratio $\lambda/(S_o-Z)$. In the measuring apparatus shown in FIG. 2, when a load W is applied at the load applying point T1 of the club shaft 11, spaced from the free end T at a distance Z, displacement detectors 12 and 13 detect the displacements (i.e., elastic deformation or deflection) $\delta 1$ and $\delta 2$ of the free end T and the load applying point T1 from the horizontal axis x, respectively. The displacements $\delta 1$ and $\delta 2$ thus detected by the detectors 12 and 13 are input to a calculator 14 which calculates the value of $\lambda/(S_o Z)$ using the distance Z and the distance $(S_o-Z)$ in accordance with the following equation;

$$\frac{\lambda}{(S_o - Z)} = 1 - \frac{\delta_1}{(\delta_2 - \delta_1)} \cdot \frac{Z}{(S_0 - Z)}$$

The result of the calculation, i.e., the value $\lambda/(S_o-Z)$ thus obtained, is indicated on an indicator 15.

As can be seen from the above discussion, according to the present invention, the figure of deflection of the club shaft is intuitively learned by the value $\lambda$. The value $\lambda$ can be easily obtained by the device according to the present invention.

Figure 3:
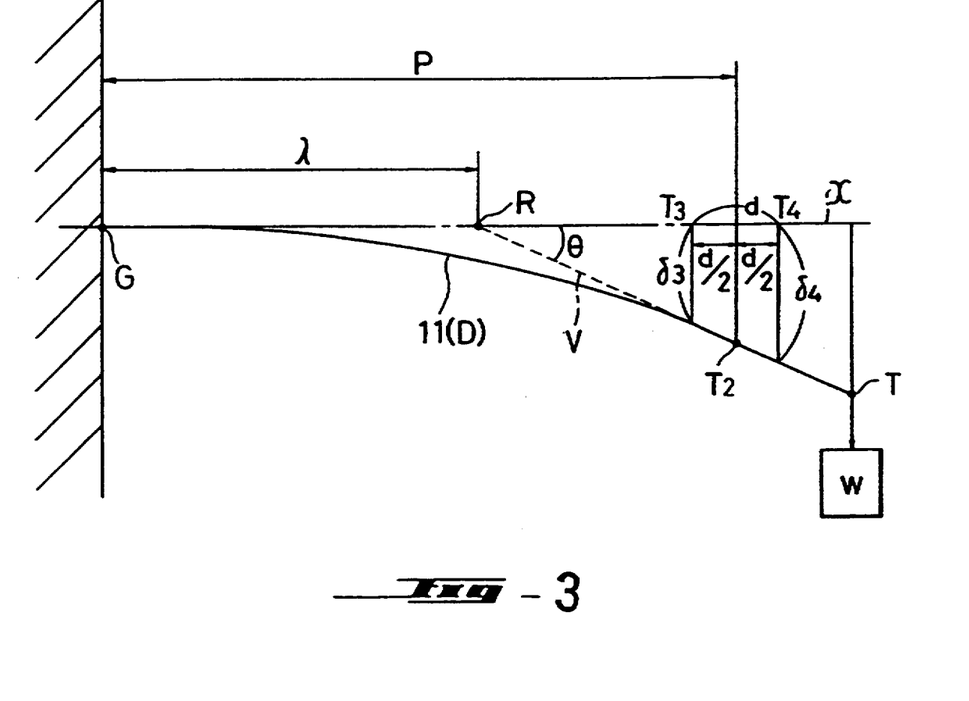
FIG. 3 is an explanatory skeleton view of another embodiment of a measuring method of a figure of deflection of a golf club shaft according to the present invention.

FIG. 3 shows another measuring apparatus. In the measuring apparatus shown in FIG. 3, load W is applied to the load applying point T at the free end of the golf club shaft 11. The portion of the golf club shaft 11 in the vicinity of its loading point (free end) can be regarded as substantially straight, provided the load W is not exceedingly heavy. The distance (value) $\lambda$ can be obtained by the following calculation:

$$\lambda = P - d(\delta_3 + \delta_4)/2(\delta_4 - \delta_3)$$

$$\lambda/P = 1 - d(\delta_3 + \delta_4)/2P(\delta_4 - \delta_3)$$

Note that $T_2$ is a point on the portion of the golf club shaft which can be regarded as non-deformed, $T_3$ and $T_4$ are points on the golf club shaft which are at a distance, $d/2$ from $T_2$ on either side of $T_2$, and $\delta_2$ and $\delta_4$ are displacements of the points $T_3$ and $T_4$ from the x-axis, when the load W is applied to the load applying point T, respectively. The actual measurement of the displacements $\delta_3$ and $\delta_4$ can be carried out according to the apparatus shown in FIG. 2.

As can be seen from the above discussion, according to the present device, the figure of deflection of the club shaft can be intuitively learned by the value $\lambda$.

Figure 4:
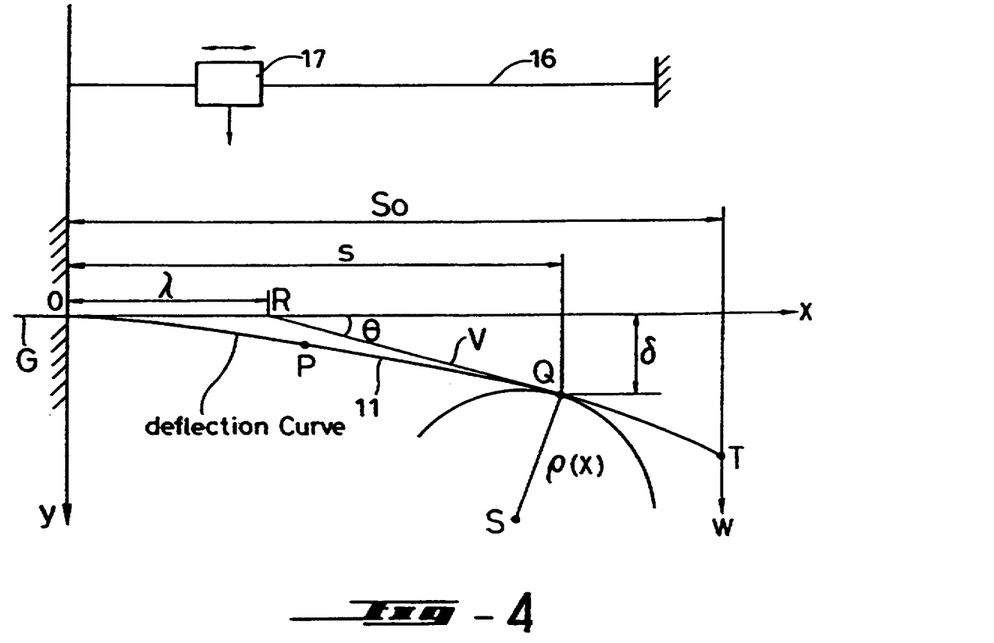
FIG. 4 is an explanatory skeleton view showing the principle of measurement of a figure of deflection of a golf club shaft according to another embodiment of the present invention.

FIG. 4 shows a more generally applicable measurement of the value $\lambda$. The basic concept of the measurement in FIG. 4 is substantially the same as that of FIG. 1. In FIG. 4, the tangent V, not at the free end T (i.e., the load applying point W), but at an optional point Q (x=s) is used to obtain the intersection R of the tangent V and the horizontal axis x. The deflection characteristics of the club shaft 11 at $0 \leq x \leq s$ is represented by the distance $\lambda$ of the intersection R from the fixed end O of the club shaft 11. When $s = S_o$, the figure of deflection of the whole length of the club shaft 11 is obtained, which corresponds to FIG. 1.

Figure 5:
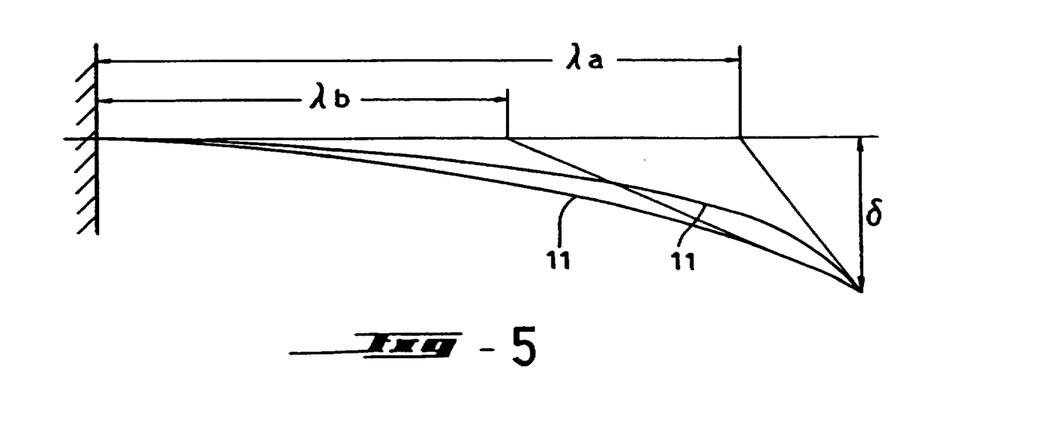
FIG. 5 is a skeleton view showing a figure of deflection of a club shaft represented by λ.

The value $\lambda$ is irrespective of the value of the load W when the elastic deformation or deflection of the club shaft is small. Consequently, as shown in FIG. 5, the parameters expressing the figure of deflections of different club shafts 11 can be distinguished by the magnitude of the value $\lambda$ ($\lambda a \geq \lambda b$ in FIG. 5). Although the displacement $\delta$ is assumed to be constant for convenience sake in FIG. 5, the above discussion can be generally applied when displacement $\delta$ is not constant.

Consequently, the club shafts 11a and 11b having the same value of $\lambda$ can be considered identical in evaluation. Namely, the figure of deflection of a golf club shaft is evaluated from a specific value $\lambda$, as follows;

① A small $\lambda$ means that larger deflection is caused at the portion near to the butt end of the club shaft;

② A large $\lambda$ means that larger deflection is caused at the portion near to the tip end of the club shaft;

③ When $\lambda$ is a medium value between the small and large values identified by ① and ②, larger deflection is caused at the portion between the butt end and the tip end of the club shaft.

In the evaluation of the club shaft represented by the distance $\lambda$, variation of the flexural rigidity of the golf club shaft in the longitudinal direction thereof is not taken into account. Namely, the club shaft 11 is tapered in the longitudinal direction. Accordingly, the bend rigidity distribution of the golf club shaft is not uniform in the longitudinal direction. The bend rigidity distribution depends on the golf club.

To this end, in the following embodiment illustrated in FIGS. 6 through 13, the figure of deflection of the golf club shaft is adjusted from a broader viewpoint, using the curvature curve of the club shaft.

Figure 6:
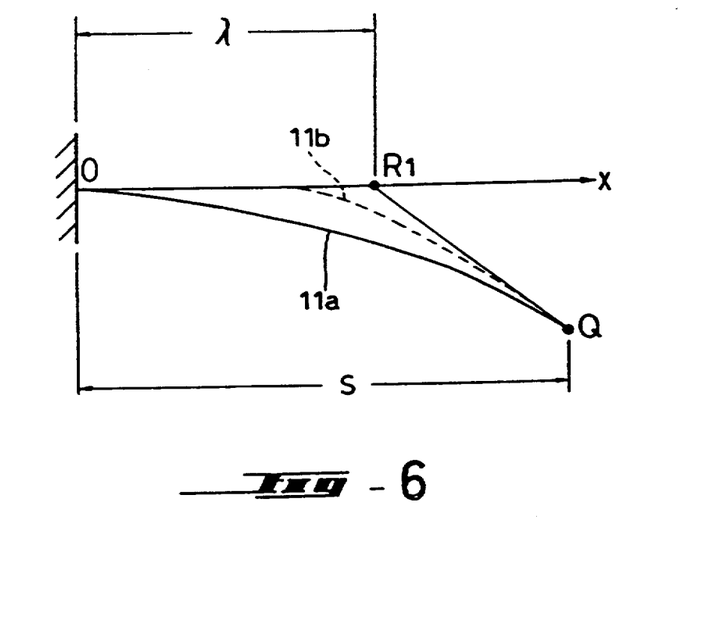
FIG. 6 is an explanatory view showing an example of deflection curves having the same λ and different shapes.
Figure 7:
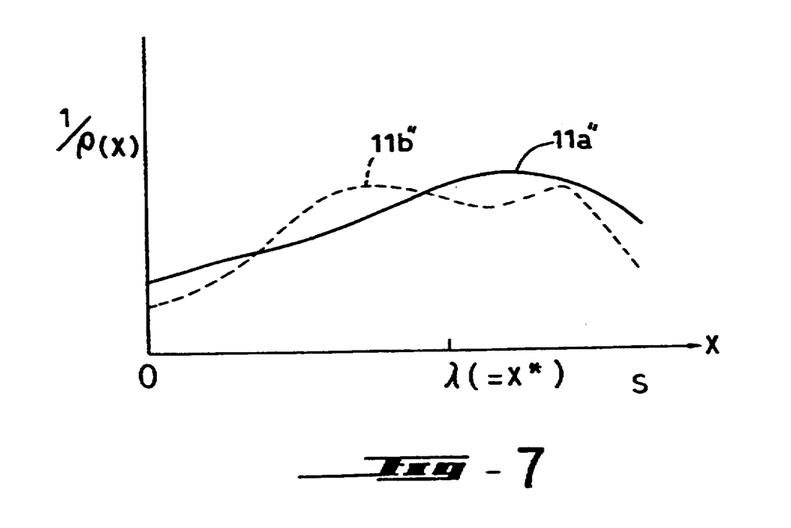
FIG. 7 is an explanatory view showing an example of curvature curves of the deflection curves shown in FIG. 6.

FIG. 6 schematically shows two deflection curves 11a and 11b having the same value of $\lambda$, and FIG. 7 schematically shows two curvature curves 11a" and 11b" of the deflection curves 11a and 11b. The club shafts 11 having different flexural rigidity distributions may exhibit different curvature curves even if the value of $\lambda$ is identical. However, this does not mean that it is meaningless to measure the value of $\lambda$ since the position of the center of figure of the curvature curve is identical to that of the value of $\lambda$ regardless of the flexural rigidity distribution.

In the present invention, to obtain the curvature curve of the club shaft 11, as can be seen in FIG. 4, a load W is suspended from the free end T of the club shaft 11 which is fixed at the grip end G, so that the club shaft 11 is elastically deflected or deformed. Consequently, the displacement of each point of the club shaft in the longitudinal direction thereof from the x-axis is measured to obtain an approximate deflection curve in accordance with the measurements. Thereafter, based on the approximate deflection curve thus obtained, a curvature curve which shows a distribution of curvature in the longitudinal direction of the club shaft is obtained.

In FIG. 4, a guide rail 16 is provided above the club shaft 11, whose grip end G is fixed, and extends in a direction parallel with the horizontal axis x. A laser meter 17 is movably guided on and along the guide rail 16. As is well known, the laser meter 17 emits a laser beam towards an object to be measured (i.e., the golf club shaft in the illustrated embodiment) and receives the laser beam reflected by the object to detect the distance of the object from the laser meter. In the illustrated embodiment, the displacements (i.e., degrees of deflection) $y(x)$ ($0 \leq x \leq s$) of selected points (i.e., sampling points) of the club shaft 11, on which the load W acts in the longitudinal direction thereof, from the horizontal axis x are measured by the laser meter 17. The sampling points are selected at a predetermined spacial interval (e.g., 15 mm) in the longitudinal direction of the club shaft 11.

Thereafter, an approximate curvature curve of the club shaft 11 is obtained from the values of $y(x)$, for example, by the following sixth-order polynomial;

$$y(x) = a_6 x^6 + a_5 x^5 + \ldots a_1 x + a_0$$

wherein the coefficients $a_6, a_5, \ldots a_0$ can be determined by the least square of the values of $y(x)$.

The following relationship exists between the deflection curve $y(x)$ and the curvature $1/\rho$ (x) when the deflection or elastic deformation of the club shaft is small;

$$\frac{1}{\rho(x)} = \frac{\frac{d^2 y}{dx^2}}{\left\{1 + \left(\frac{dy}{dx}\right)^2\right\}^{3/2}} \approx \frac{d^2 y}{dx^2}$$

Namely, the curvature curve can be obtained by differentiating the deflection curve $y(x)$ twice, as follows.

$$y'(x) = 6 \cdot a_6 x^5 + 5 \cdot a_5 x^4 + \ldots 2 \cdot a_2 x + a_1$$

$$y''(x) = 5 \cdot 6 \cdot a_6 x^4 + 4 \cdot 5 \cdot a_5 x^3 + \ldots 1 \cdot 2 \cdot a_2$$

Since the curvature curve thus obtained by the two differentiations represents the distribution of curvature of the club shaft 11 in the longitudinal direction thereof, the figure of deflection of the golf club shaft 11 in broader sense is expressed by the curvature curve.

Note that $\rho$ (x) in FIG. 4 designates the radius of the curvature circle at an optional x axis on the deflection curve, and S the center of the curvature circle, respectively.

Figure 8:
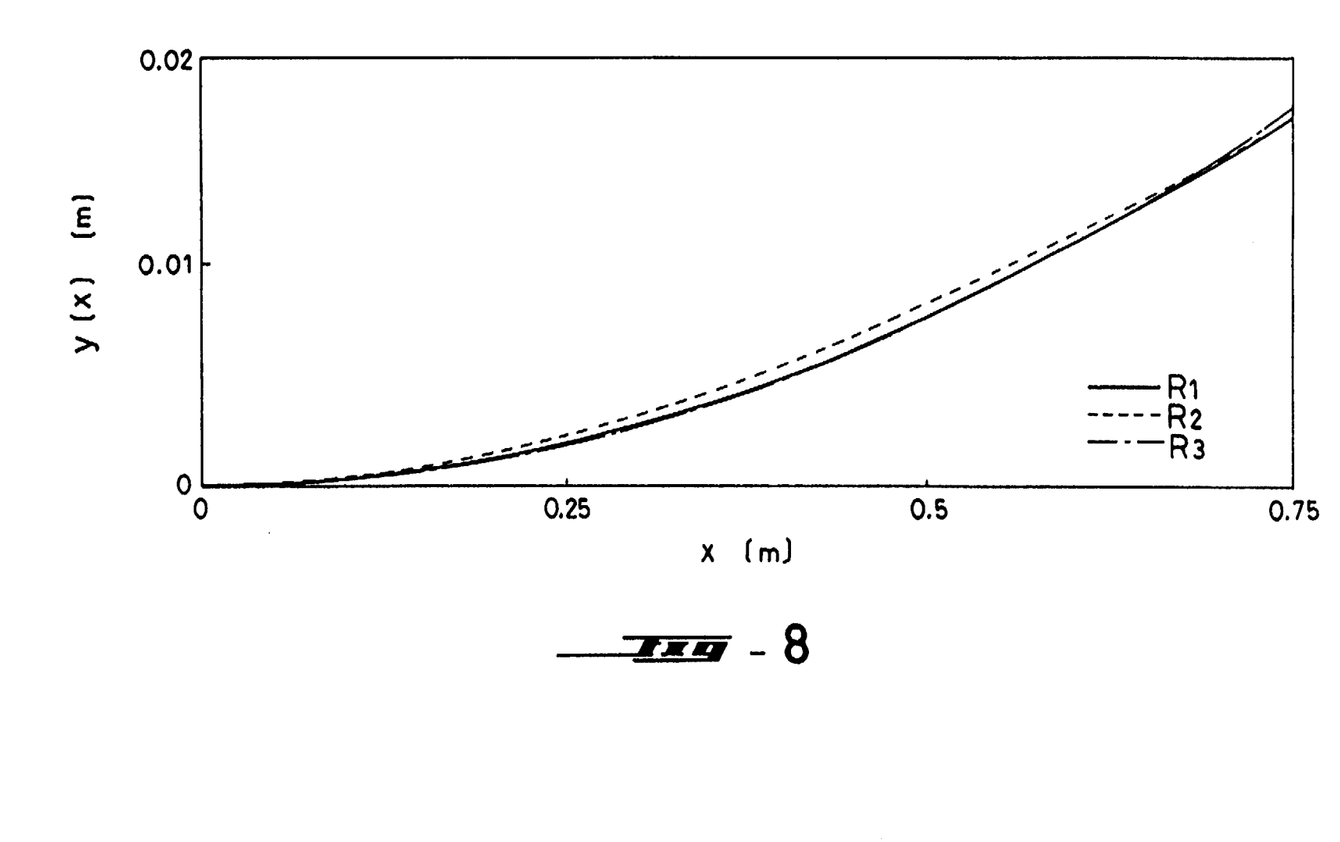
FIG. 8 is a diagram showing examples of approximate deflection curves of three golf club shafts whose hardnesses are all R.
Figure 10:
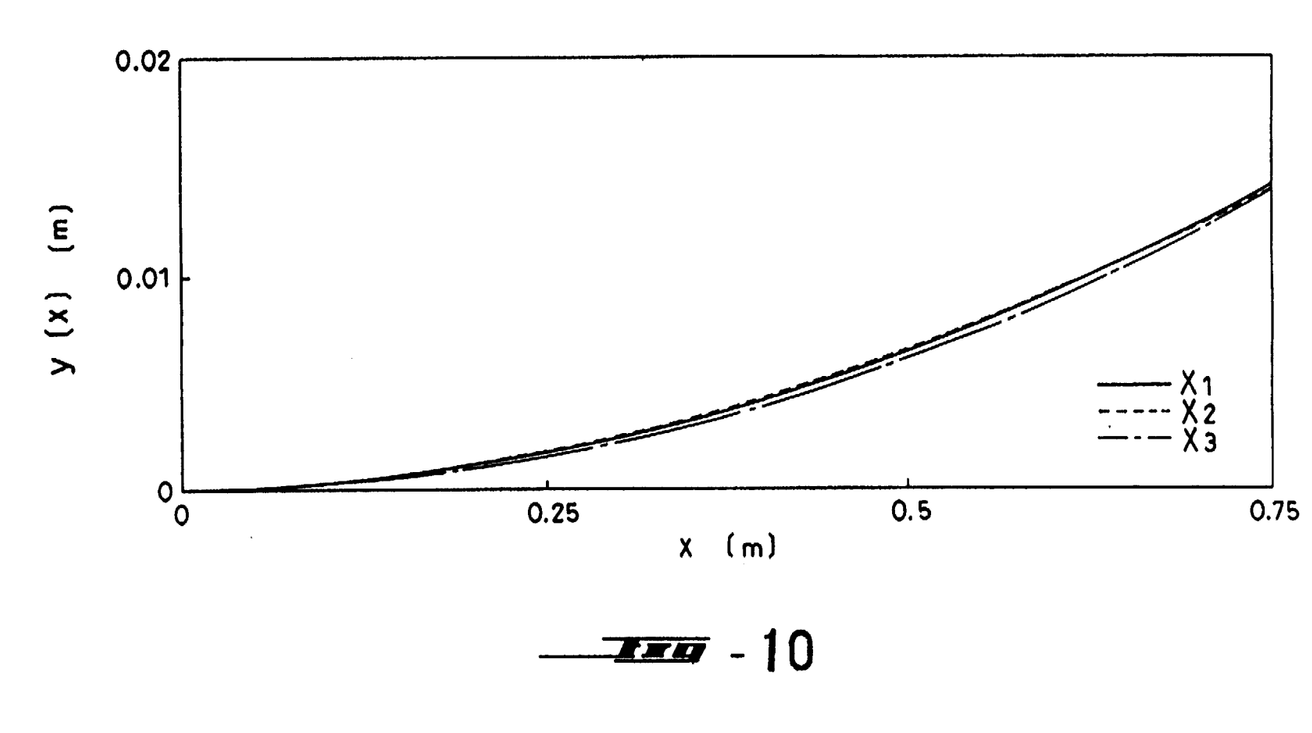
FIG. 10 is a diagram showing examples of approximate deflection curves of three golf club shafts whose hardnesses are all X.
Figure 11:
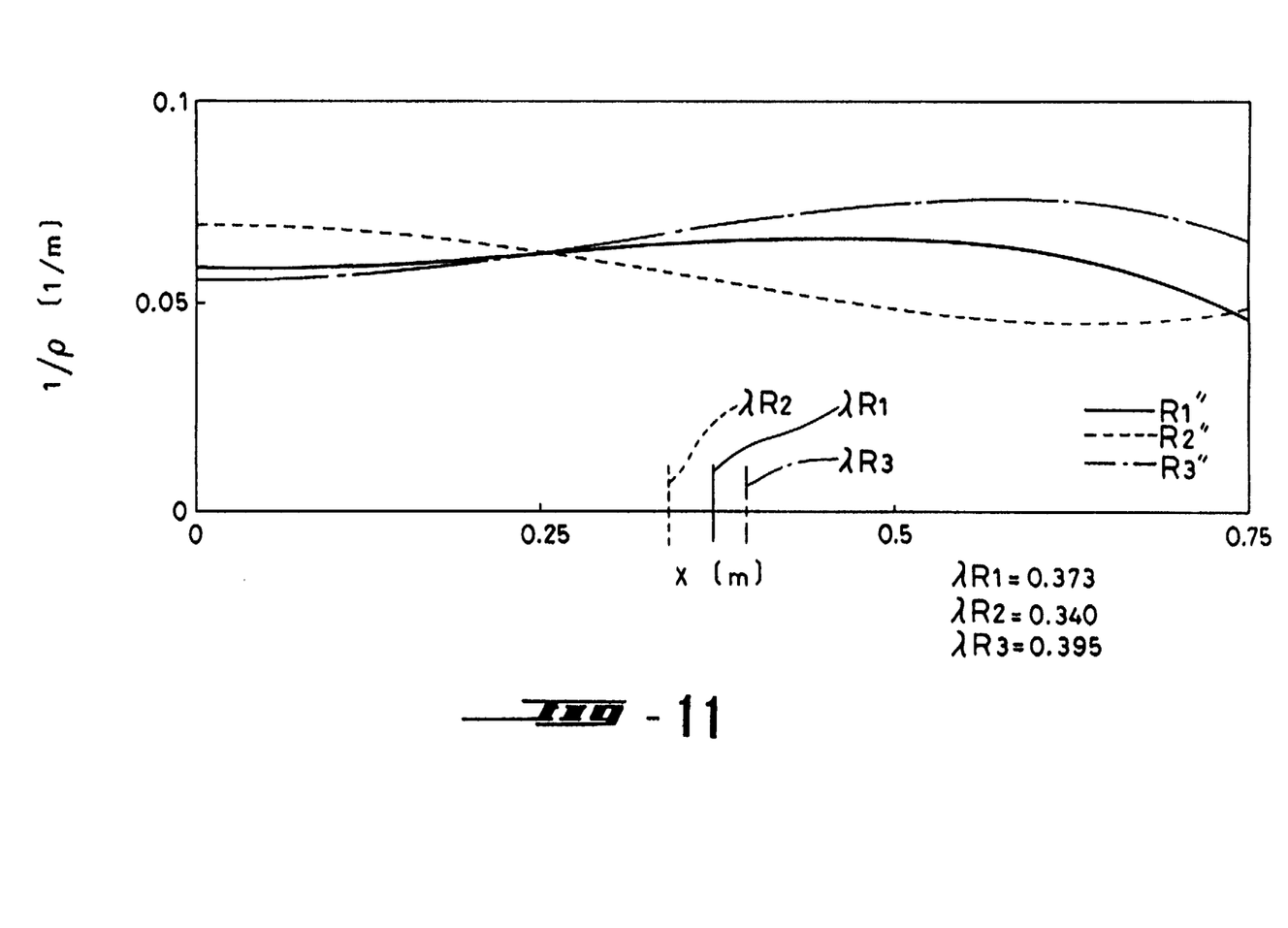
FIG. 11 is a diagram showing curvature curves obtained by the three approximate deflection curves shown in FIG. 8.
Figure 12:
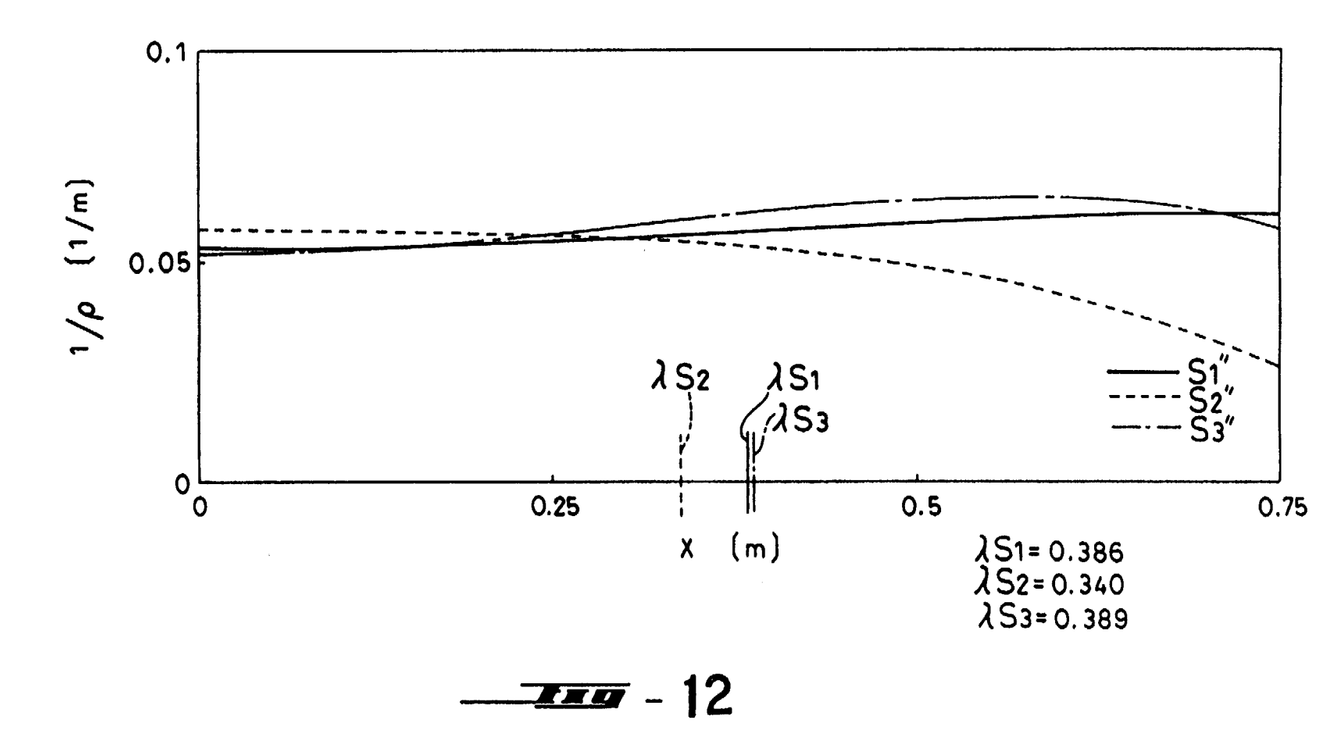
FIG. 12 is a diagram showing curvature curves obtained by the three approximate deflection curves shown in FIG. 9.
Figure 13:
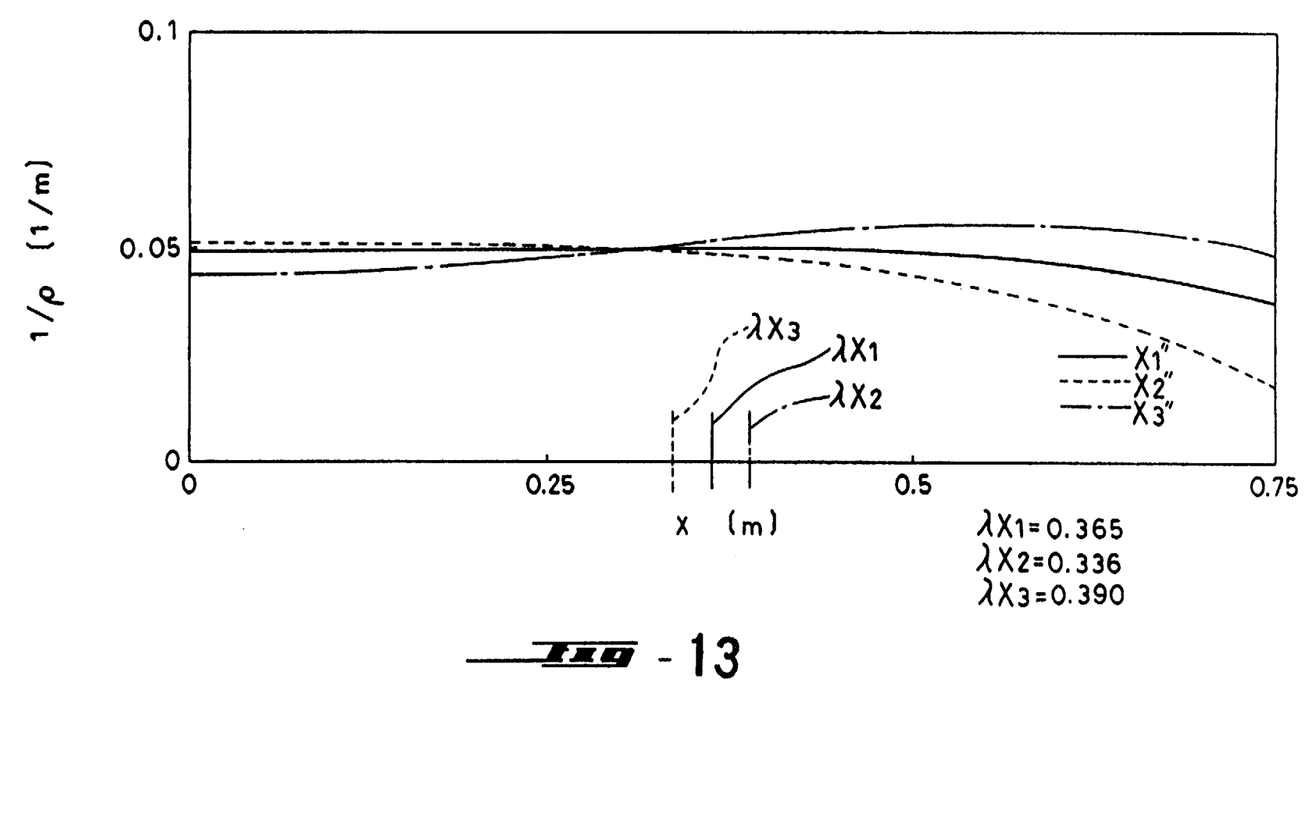
FIG. 13 is a diagram showing curvature curves obtained by the three approximate deflection curves shown in FIG. 10.

FIGS. 8, 9, and 10 show examples of the approximate deflection curves of the golf club shaft 11 that were obtained by actual measurements. FIGS. 11, 12, and 13 show examples of the curvature curves obtained from the approximate deflection curves shown in FIGS. 8, 9, and 10, respectively.

FIG. 8 shows three approximate deflection curves R1, R2, and R3 of three conventional golf club shafts having the hardness "R". Similarly, FIGS. 9 and 10 show three approximate deflection curves S1, S2, and S3 of three conventional golf club shafts having the hardness "S" and three approximate deflection curves X1, X2 and X3 of three conventional golf club shafts having the hardness "X", respectively. Note that, as is well known, the symbols "R", "S", and "X" designate hardness. As can be seen from FIGS. 8, 9, and 10, the difference in shape of the approximate deflection curves in each figure is too minute to discriminate among them.

Figure 14:
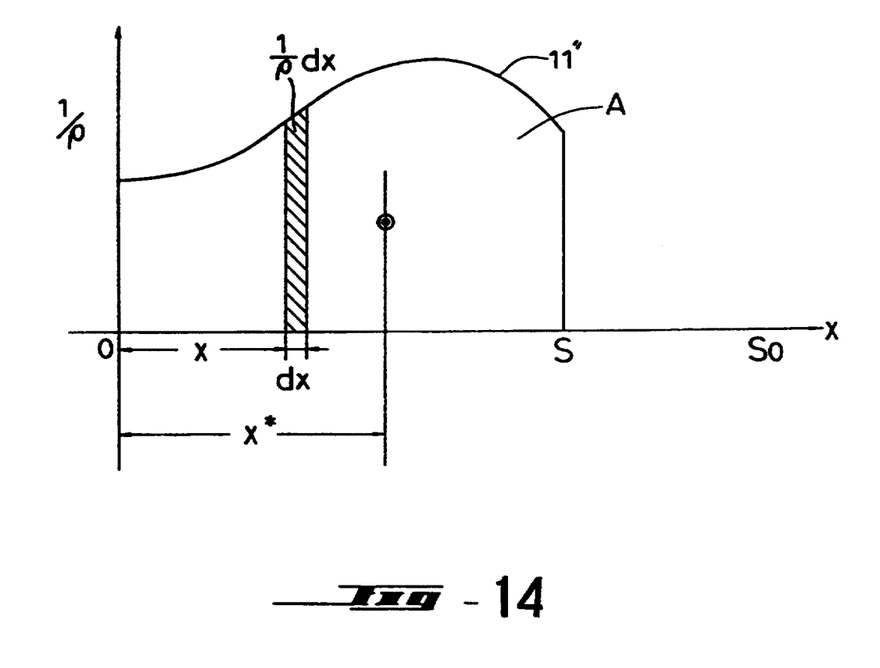
FIG. 14 is an explanatory view showing that an X-coordinate (abscissa) value of a center of figure of the curvature curves is identical to λ.

FIG. 11 shows three curvature curves R1, R2 and R3 which were obtained from the three approximate deflection curves R1, R2, and R3 shown in FIG. 8. Similarly, FIGS. 13 and 14 show three curvature curves S1, S2 and S3 and three curvature curves X1, X2, and X3, obtained from the three approximate deflection curves S1, S2, and S3 and the three approximate deflection curves X1, X2, and X3 shown in FIGS. 9 and 10, respectively. As can be seen in FIGS. 11, 12, and 13, the difference in shape of the curvature curves in each figure is large enough to distinguish them. Namely, the macroscopic measurement of the deflection curves in FIGS. 8 through 10 is adjusted by or replaced with the microscopic measurement of the curvature curves in FIGS. 11 through 13.

The inventors of the present invention have found that the distance from the origin O to the center of figure of the curvature curve is identical to the abovementioned distance$\lambda$ representing the figure of deflection, regardless of the flexural rigidity distributions.

In FIG. 14, the center of figure is defined by;

$$Ax^* = \int_0^s x \frac{1}{\rho} dx \quad (0 \leq x \leq s)$$

$$A = \int_0^s \frac{1}{\rho} dx = \int_0^s \frac{d^2 y}{dx^2} dx = y'(s) - y'(0) = \theta$$

$(\because y'(0) = 0)$ $$\int_0^s x \frac{1}{\rho} dx = \int_0^s s \frac{d^2 y}{dx^2} dx = \left[x \cdot \int_0^s \frac{d^2 y}{dx^2} dx\right]_0^s -$$

$$\int_0^s \frac{dy}{dx} dx = [x(y'(x) - y'(0))]_0^s - \{y(s) - y(0)\} = s\theta - \delta$$

$(\because y(s) = \delta)$ $$\therefore x^* = \frac{1}{A} \int_0^s x \cdot \frac{1}{\rho} dx = \frac{1}{\theta}(s\theta - \delta) = s - \frac{\delta}{\theta} \approx$$

$$s - \overline{RQ} = \lambda$$

wherein "A" designates the surface area A of the portion defined by the curvature curve "11" of the club shaft 11, and x* the x-coordinate of the center of figure, respectively.

Namely, the value of $\lambda$ is given by the center of figure of the curvature curve "11". Accordingly, the whole figure of deflection of the club shaft can be first obtained from the curvature curve thereof, and the parameter $\lambda$ can then be obtained from the center of figure of the curvature curve. It should be noted that the curvature curve includes information regarding both the value $\lambda$ and the deflection amount $\delta$.

The centers of figures of the curvature curves R1, R2, R3; S1, S2, S3 and X1, X2, X3 are indicated at $\lambda$R1, $\lambda$R2, $\lambda$R3; $\lambda$S1, $\lambda$S2, $\lambda$S3; $\lambda$X1, $\lambda$X2, $\lambda$X3 in FIGS. 11, 12 and 13, respectively.

In the above-mentioned embodiment, although the sixth-order polynomial is used as a basic curve from which the approximate deflection curve is obtained, the sixth-order polynomial can be replaced with, for example, a fourth-order or eighth-order polynomial.

Figure 15:
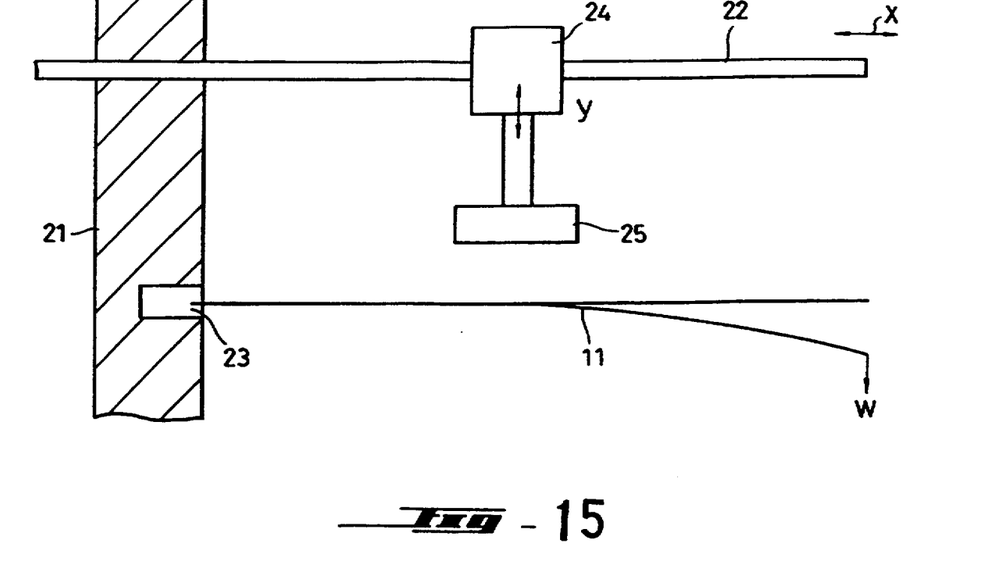
FIG. 15 is a side elevational view of an apparatus for measuring deformation of a club shaft, according to the present invention; and, FIG. 16 is a right side elevational view of FIG. 15.
Figure 16:
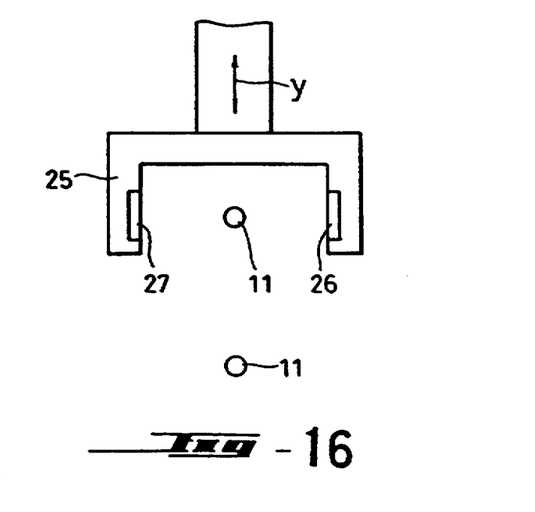

FIGS. 15 and 16 show an embodiment of a measuring apparatus which achieves the measuring method discussed above, according to the present invention.

The measuring apparatus is embodied, for example, by modifying a known outer diameter meter, and includes a base post 21 and a horizontal rail 22 extending in the x-direction and secured to the base post 21. The horizontal rail 22 is provided with a movable table 24 which moves along the horizontal rail 22 in the x-direction. The movable table 24 has a generally U-shaped laser unit 25 (FIG. 16) which is movable in the y-direction (vertical direction) with respect to the movable table 24. The movable table 24 is provided therein with a drive mechanism (not shown) for moving the laser unit 25 in the y-direction and a detector (not shown) for detecting the displacement of the movable table 24. The generally U-shaped laser unit 25 has a light emitter 26 which emits a bundle of laser beams and a light receiver 27 which receives the laser beams emitted from the light emitter 26. The light emitter 26 and the light receiver 27 are provided on opposite legs of the U-shaped laser unit 25, so that they are opposed to each other. The outer diameter of the bundle of laser beams is larger than the outer diameter of the club shaft 11 to be measured. The club shaft 11 is placed between the opposite legs of the laser unit 25 when the latter is moved down.

The movable table 24 is intermittently moved in the x-direction by a distance corresponding to an interval of the sampling points before and after the load is applied to the tip end of the golf club shaft. In both states, the laser unit 25 is moved downwardly in the y-direction, perpendicular to the x-direction, at each sampling point by a drive mechanism (not shown) provided in the movable table 24, as mentioned above. When the laser unit 25 moves to a lower position in which the club shaft 11 is placed in the laser unit, the laser beams emitted from the light emitter 26 are intercepted by the club shaft 11. In the state that the laser beams emitted from the light emitter 26 are intercepted by the club shaft, the output of the light receiver 27 can detect the vertical position of the club shaft 11 relative to laser unit 25. Consequently, the center position of the club shaft 11 in the y-direction can be detected by the output of the light receiver 27 and the information of the position of the laser unit 25 in the y-direction.

The measurements mentioned above are carried out before and during the time at which load W is applied to the front end of the club shaft 11, so that the displacement (i.e., elastic deformation or deflection) of the club shaft from the axis x can be obtained.

As can be understood from the above discussion, according to the present invention, the figure of deflection of the golf club shaft can be measured in a way that is intuitively learned.

Furthermore, according to the present invention, the value of $\lambda$ can be easily obtained from the curvature curve which is in turn obtained from the deflection curve of the club shaft.

Consequently, according to the present invention, golf club shafts substantially equivalent in characteristics to existing golf club shafts can be mass-reproduced by measuring or setting the value $\lambda$ and/or curvature curve, as discussed above. This makes it possible to realize a modern scientific manufacturing method of golf clubs, instead of the conventional manufacturing method that has required a highly skilled manufacturer. It is therefore possible to make golf club shafts having the same figure of deflection.

We claim:

1. A method for measuring figure of deflection of a golf club shaft, comprising the steps of:

horizontally orienting the golf club shaft along an x-axis and fixing a grip end of the golf club shaft to form a cantilever;

deflecting the golf club shaft by applying a predetermined load at a point on the golf club shaft located on or near the free end thereof so as to form a deflection curve of the golf club shaft;

obtaining an intersection point of a tangent of the deflection curve and said x-axis, wherein said tangent is obtained at the load applying point or in the vicinity of the load applying point of the golf club shaft; and determining, for use as said figure of deflection of the golf club shaft, the distance between a specific point on the golf club shaft and said intersection point, said specific point being different from said intersection point and different from said load applying point.

2. A measuring method according to claim 1, wherein the load applying point is located at the free end of the golf club shaft.

3. A measuring method according to claim 1, wherein the specific point is defined by the point at which the grip end of the golf club shaft is fixed.

4. A method for measuring figure of deflection of a golf club shaft, comprising the steps of:

horizontally orienting the golf club shaft along an x-axis and fixing a grip end of the golf club shaft to form a cantilever;

applying a predetermined load at a point on the golf club shaft, thereby defining a deflection curve;

obtaining an intersection point of a tangent of the deflection curve and said x-axis, wherein said tangent is obtained at the load applying point or in the vicinity of the load applying point of the gold club shaft;

determining the distance between the intersection point and a specific point on the golf club shaft, said specific point being different from said intersection point and different from said load applying point.

5. A measuring method according to claim 4 and further including the step of determining the ratio $\lambda/S_o$ for use as said figure of deflection, wherein $\lambda$ designates said distance between the intersection point and a specific point on the golf club shaft, and $S_o$ designates the length of the golf club shaft.

6. An apparatus for measuring figure of deflection of a golf club shaft, comprising:

holding means for holding a grip end of the golf club shaft so as to orient said shaft horizontally along an x-axis to form a cantilever, said x-axis being defined by a center axis of the golf club shaft when no load is applied thereto;

means for applying a predetermined load at a point on the golf club shaft held by said holding means to deflect said shaft and cause it to assume a shape defining a deflection curve;

means for ascertaining the point of which a line tangent of the deflection curve intersects said x-axis, wherein said tangent line is tangent to said deflection curve at said load applying point or in the vicinity of said load applying point of the golf club shaft; and means for determining, for use as said figure of deflection of said golf club shaft, the distance between said intersection point and a specific point on the golf club shaft, said specific point being different from said intersection point and different from said load applying point.

7. A measuring apparatus according to claim 6, wherein the load applying point is located at the free end of the golf club shaft.

8. A measuring apparatus according to claim 6, wherein the specific point is defined by the fixed point of the grip end of the golf club shaft.

9. An apparatus for measuring figure of deflection of a golf club shaft, comprising;
means for horizontally orienting the golf club shaft along an x-axis and fixing a grip end of the golf club shaft to form a cantilever, said x-axis being defined by a center axis of the golf club shaft when no load is applied thereto;
means for applying a predetermined load at a point on the golf club shaft, whose grip end is fixed to form a cantilever, to define a deflection curve thereof;
means for detecting displacements of the center axis, when the load is applied to the load applying point, of the load applying point and the free end of the golf club shaft from said x-axis; and,
means for calculating a $\lambda$ and/or a ratio of $\lambda/(S_o - Z)$, in accordance with the displacements, wherein $\lambda$ designates the distance from the fixed end of the golf club shaft to an intersection point of a tangent of the deflection curve of the golf club shaft at the load applying point, which is obtained when the load is applied at the load applying point, and said x axis, Z the distance between the load applying point and the free end of the golf club shaft, and $S_o$ the length of the golf club shaft.

10. An apparatus for measuring figure of deflection of a golf club shaft, comprising:
means for horizontally orienting the golf club shaft along an x-axis and fixing a grip end of the golf club shaft to form a cantilever, said x-axis being defined by a center axis of the golf club shaft when no load is applied thereto;
means for applying a predetermined load at a point on the golf club shaft, whose grip end is fixed to form a cantilever, to define a deflection curve thereof;
means for detecting displacements of the center axis, when the load is applied to the load applying point, of the load applying point and the free end of the golf club shaft from said x-axis, said detecting means comprising a laser unit including a light emitter which emits laser beams and a light receiver which receives the laser beams emitted from the light emitter; and
means for calculating a $\lambda$ and/or a ratio of $\lambda/(S_o - Z)$, in accordance with the displacements, wherein $\lambda$ designates the distance from the fixed end of the golf club shaft to an intersection point of a tangent of the deflection curve of the golf club shaft at the load applying point, which is obtained when the load is applied at the load applying point, and said x-axis, Z the distance between the load applying point and the free end of the golf club shaft, and $S_o$ the length of the golf club shaft.

11. A measuring apparatus according to claim 10, further comprising a movable table which supports the laser unit and moves in the x-axis direction.

12. A measuring apparatus according to claim 11, wherein said laser unit is movable in a direction perpendicular to the direction of movement of the movable table.

13. A method for measuring figure of deflection of a golf club shaft, comprising the steps of:
horizontally orienting the golf club shaft along an x-axis and fixing a grip end of the golf club shaft to form a cantilever,
applying a predetermined load at a point on the golf club shaft to deflect the shaft;
measuring the displacement of the golf club shaft from said x-axis, at a plurality of sampling points in the longitudinal direction of the golf club shaft; and
obtaining an approximate deflection curve of the golf club shaft in accordance with the measurements of the displacements; and,
obtaining a curve which represents a curvature distribution of the golf club shaft in the longitudinal axis direction, based on the approximate deflection curve.

14. A measuring method according to claim 13, further comprising the step of detecting a center of figure of the curvature curve.

15. A measuring method according to claim 14, further comprising the step of detecting a distance of the center of figure of the curvature curve from the fixed point of the golf club shaft at the grip end side thereof, so that the distance $\lambda$ of the center of figure of the curvature curve thus detected represents the figure of deflection on the golf club shaft.

16. A measuring method according to claim 15, wherein the displacements of the golf club shaft from the x axis are measured at sampling points of the load applying points located at predetermined intervals in the longitudinal direction of the golf club shaft.

17. A measuring method according to claim 16, wherein said approximate deflection curve is obtained by a least square method, applying the displacements of the golf club shaft from the x axis to a sixth-order polynomial.

18. An apparatus for measuring figure of deflection of a golf club shaft, comprising;
means for horizontally orienting the golf club shaft along an x-axis and fixing a grip end of the golf club shaft to form a cantilever, said x-axis being defined by a center axis of the golf club shaft when no load is applied thereto;
means for applying a predetermined load at a point on the golf club shaft to define a deflection curve thereof;
means for detecting displacements of the center axis of two measuring points located in the vicinity of the load applying point of the golf club shaft from said x-axis; and,
means for calculating a $\lambda$ and/or a ratio of $\lambda/P$, in accordance with the displacements, wherein P is the distance between the fixed end of the golf club shaft and a middle point of the two measuring points, and d/2 is half the distance between the two measuring points, and wherein $\lambda$ designates the distance from the fixed end of the golf club shaft to an intersection point of a tangent of the deflection curve of the golf club shaft at the middle point, and said x axis.

19. An apparatus for measuring the figure of deflection of a golf club shaft, comprising:

- holding means for holding a grip end of the golf club shaft so as to orient said shaft horizontally along an x-axis to form a cantilever, said x-axis being defined by a center axis of the golf club shaft when no load is applied thereto;
- means for applying a predetermined load at a point on the golf club shaft to deflect the shaft;
- means for measuring the displacement of the golf club shaft from said x-axis, at a plurality of sampling points in the longitudinal direction of the golf club shaft;
- means for obtaining an approximate deflection curve of the golf club shaft in accordance with the displacement measurements; and,
- means for obtaining a curve which represents a curvature distribution of the golf club shaft in the longitudinal axis direction, based on the approximate deflection curve, said displacement measuring means including:

- a horizontal rail extending in the x-direction;
- a movable table which moves along said horizontal rail;
- a laser unit which is supported on said movable table so as to move in the y-direction perpendicular to the x-axis, said laser unit having a light emitter and a light receiver opposed to each other so that the golf club shaft located therebetween, depending on the position of said laser unit in said y-direction, intercepts a part of the light flux emitted from the light emitter and received by the light receiver;
- means for detecting the displacement of said movable table in the x-direction from a reference point;
- means for detecting the displacement of said laser unit in the y-direction from a reference point; and,
- means for detecting the relative displacement of the golf club shaft from the laser unit in the y-direction using the output of said light receiver.

* * * * *